(12) United States Patent
Hwang et al.

(10) Patent No.: US 10,885,620 B2
(45) Date of Patent: Jan. 5, 2021

(54) NEURAL NETWORK IMAGE PROCESSING SYSTEM

(71) Applicant: OMRON Corporation, Kyoto (JP)

(72) Inventors: Jaewook Hwang, Kyoto (JP); Shiro Fujieda, Kyoto (JP); Yasuyuki Ikeda, Moriyama (JP); Kazushi Yoshioka, Kusatsu (JP)

(73) Assignee: OMRON Corporation, Kyoto (JP)

( * ) Notice: Subject to any disclaimer, the term of this patent is extended or adjusted under 35 U.S.C. 154(b) by 97 days.

(21) Appl. No.: 15/893,682

(22) Filed: Feb. 11, 2018

(65) Prior Publication Data

US 2019/0043185 A1    Feb. 7, 2019

(30) Foreign Application Priority Data

Aug. 4, 2017   (JP) ................ 2017-151291

(51) Int. Cl.
*G06K 9/00*    (2006.01)
*G06K 9/62*    (2006.01)
(Continued)

(52) U.S. Cl.
CPC ........ *G06T 7/0004* (2013.01); *G06K 9/00771* (2013.01); *G06K 9/6262* (2013.01);
(Continued)

(58) Field of Classification Search
CPC ........... G06K 2209/19; G06K 9/00771; G06K 9/6262; G06K 9/6271; G06K 9/6292;
(Continued)

(56) References Cited

U.S. PATENT DOCUMENTS

2017/0337682 A1* 11/2017 Liao ..................... G06T 7/30
2018/0032846 A1*  2/2018 Yang .................. G06K 9/4604

FOREIGN PATENT DOCUMENTS

CN    1984258    6/2007
CN    1992817    7/2007
(Continued)

OTHER PUBLICATIONS

Alex Krizhevsky, et al., "ImageNet Classification with Deep Convolutional Neural Networks," Proceeding, NIPS'12 Proceedings of the 25th International Conference on Neural Information Processing Systems, vol. 1, Dec. 2012, pp. 1097-1105.
(Continued)

*Primary Examiner* — Kenny A Cese
(74) *Attorney, Agent, or Firm* — JCIPRNET

(57) ABSTRACT

Provided is an image processing system which determines at least one object using a low function device and a high function device having higher calculation capacity than the low function device. The low function device includes a part configured to output a first determination result which identifies the objects by applying a first convolution neural network to captured images of the objects, and a part configured to output the captured image to the high function device when the first determination result meets a predetermined condition. The high function device includes a part configured to apply a second convolution neural network preliminarily learned from a sample which is at least partially common to the first neural network to the captured image and to output a second determination result which identifies the object.

8 Claims, 11 Drawing Sheets

(51) Int. Cl.
*G06N 3/04* (2006.01)
*G06T 7/00* (2017.01)

(52) U.S. Cl.
CPC ......... *G06K 9/6271* (2013.01); *G06K 9/6292* (2013.01); *G06N 3/0454* (2013.01); *G06N 3/0472* (2013.01); *G06K 9/00288* (2013.01); *G06K 2209/19* (2013.01); *G06T 2207/20081* (2013.01); *G06T 2207/20084* (2013.01); *G06T 2207/30164* (2013.01)

(58) Field of Classification Search
CPC ............. G06K 9/00288; G06N 3/0454; G06N 3/0472; G06T 2207/20081; G06T 2207/20084; G06T 2207/30164; G06T 7/0004
See application file for complete search history.

(56) References Cited

FOREIGN PATENT DOCUMENTS

| | | |
|---|---|---|
| CN | 103411974 | 11/2013 |
| CN | 104487843 | 4/2015 |
| CN | 106203333 | 12/2016 |
| CN | 106228177 | 12/2016 |
| CN | 106875373 | 6/2017 |
| CN | 106940562 | 7/2017 |
| JP | 2008310700 | 12/2008 |

OTHER PUBLICATIONS

"Office Action of China Counterpart Application", dated Oct. 10, 2020, with English translation thereof, p. 1-p. 31.

Li Chao, "Chapter 3, Work Flow of CNN workpiece Defect Detection," Information Technology Series of China Masters' Theses Full-text Database, with concise English description relevance in the office action of China counterpart application (application No. 201810153471.4), vol. 2, Feb. 2017, pp. 1-26.

\* cited by examiner

| workpiece | LFD | HFD | QMD |
|---|---|---|---|
| workpiece 1 | 70% (OK) | – | LDF data only |
| workpiece 2 | 45% (NG) | 80% (OK) | LFD+HFD data |

NEURAL NETWORK IMAGE PROCESSING SYSTEM

CROSS-REFERENCE TO RELATED APPLICATION

This application claims the priority benefit of Japan application serial no. 2017-151291, filed on Aug. 4, 2017. The entirety of the above-mentioned patent application is hereby incorporated by reference herein and made a part of this specification.

BACKGROUND

Technical Field

The disclosure relates to an image processing system, and more particularly to an image processing system using a neural network.

Description of Related Art

In the field of factory automation (FA), automatic control using an image measurement processing has been widely implemented. For example, by imaging an object to be inspected such as a workpiece and calculating a feature amount such as a defect from the captured image, an inspection process for checking the quality of the workpiece is realized.

As an example of such image measurement processing, a convolution neural network (hereinafter, also simply referred to as "CNN") is attracting attention. For example, as disclosed in Non-Patent Document 1 ("ImageNet Classification with Deep Convolutional Neural Networks," A. Krizhevsky, I. Sutskever, and G. E. Hinton, In Advances in Neural Information Processing Systems, 2012), a CNN is a network having a multilayered structure in which a convolution layer and a pooling layer are alternately arranged.

When an image analysis or the like is performed using the CNN as in the technique disclosed in Non-Patent Document 1 described above, the CNN is constructed by learning using multiple learning images, and the constructed CNN is used for the image analysis.

On the other hand, in an image processing device using the CNN, parameters of a CNN network model are not optimized when a measurement target is not a learned object. In this case, the image processing device requires calculation performance for learning, and the calculation performance cannot be performed by a low function device. Further, when a network model with a large calculation amount is constructed in the image processing device, the calculation performance will be insufficient in the low function device. In this case, the image processing device cannot finish determination within a certain period of time and thus cannot inspect an object in real time.

SUMMARY

According to one embodiment of the disclosure, there is provided an image processing system which determines at least one object using one or a plurality of first devices and a second device having a higher calculation capability than the first device, wherein the first device includes a part configured to apply a first neural network to a captured image of the object and to output a first determination result which identifies the object, and a part configured to output the captured image to the second device when the first determination result meets a predetermined condition, the second device includes a part configured to apply a second neural network preliminarily learned from a sample which is at least partially common to the first neural network to the captured image and to output a second determination result which identifies the object, and the first neural network and the second neural network have a network structure having an intermediate layer and at least a part of which has a common portion.

According to another embodiment of the disclosure, there is provided an image processing system which determines at least one object using one or a plurality of first devices and a second device having a higher calculation capability than the first device, wherein the first device includes a part configured to apply a first neural network to a captured image of the object and to output a first determination result which identifies the object, and a part configured to output a data signal at an intermediate stage of the first neural network to the second device when the first determination result meets a predetermined condition, the second device includes a part configured to output a second determination result which identifies the object using a second neural network which is at least partially common to the first neural network, the first neural network and the second neural network have a network structure having an intermediate layer and at least a part of which has a common portion, and the part configured to output the second determination result applies the data signal from a layer of the second neural network corresponding to the intermediate stage of the first neural network.

DESCRIPTION OF THE EMBODIMENTS

Figure 1:
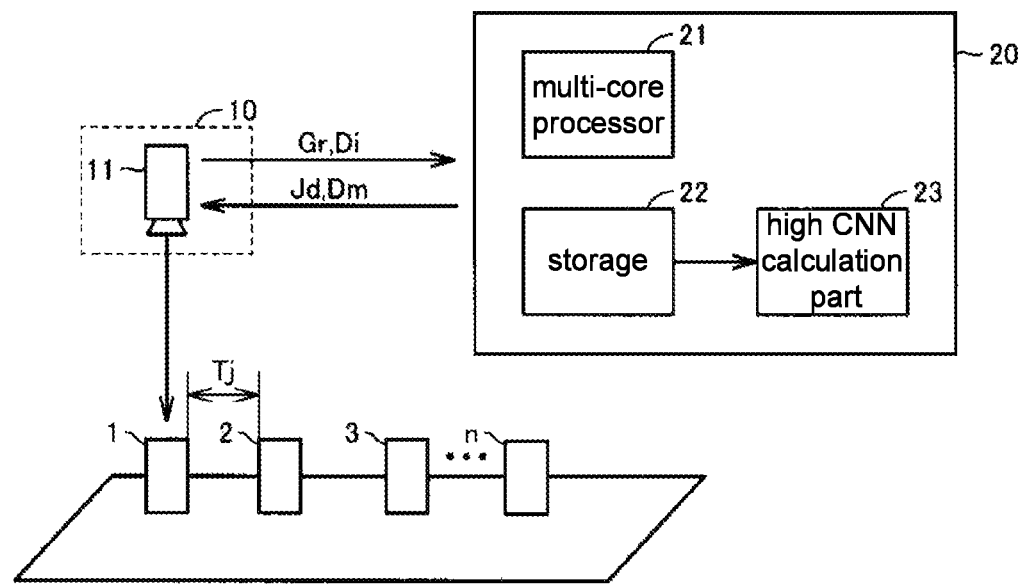
FIG. 1 is a schematic diagram illustrating an image processing system 100A according to a first embodiment of the disclosure.

The embodiments of the disclosure provide an image processing system capable of improving accuracy of a determination even when a low function device is disposed on site.

In one or some exemplary embodiments, the first device may receive the second determination result and determine the object in real time.

In one or some exemplary embodiments, the first device may include a part configured to output the captured image of which a first determination result is less than a predetermined accuracy to the second device, and the second device may include a part configured to relearn the second neural network on the basis of the captured image which is less than the predetermined accuracy.

In one or some exemplary embodiments, the relearning part may relearn the second neural network when off-line.

In one or some exemplary embodiments, the second device may include a part configured to create a model of the first neural network on the basis of a portion of the relearned second neural network which is common to the first neural network, and a part configured to relearn a portion unique to the first neural network in the model of the first neural network.

In one or some exemplary embodiments, the image processing system may further include a management device configured to manage the determination result for each object, the first device may include a part configured to output the first determination result to the management device and a part configured to output the captured image of which the first determination result is less than the predetermined accuracy to the second device, the second device may include a part configured to output the second determination result to the management device, and the management device may associate at least one of the first determination result and the second determination result with the object for each of the objects.

In one or some exemplary embodiments, the first neural network and the second neural network may be convolution neural networks.

According to the embodiments of the disclosure, it is possible to improve accuracy of determination even when a low function device is disposed on site.

Embodiments of the disclosure will be described in detail with reference to the drawings. Further, in the drawings, the same or corresponding parts are designated by the same reference numerals, and the description thereof will not be repeated.

In the following, a convolution neural network (CNN) will be described as an example of a neural network. However, in addition to the CNN, a network structure used for image processing includes, for example, a deep belief network (DBN) and a stacked denoising autoencoder (SDA).

The disclosure is directed to a network structure which has an intermediate layer and at least a part of which has a common portion. Specifically, a neural network which has the intermediate layer or a deep neural network as well as the CNN is also included in an object of the disclosure.

First Embodiment

FIG. 1 is a schematic diagram illustrating an image processing system 100A according to a first embodiment of the disclosure.

Referring to FIG. 1, the image processing system 100A includes a low function device 10 and a high function device 20. For example, the low function device is a device with relatively low calculation performance including a sensor controller which performs input and determination at an FA site. For example, the high function device is a device with relatively high calculation performance including a server connected to a personal computer (PC) or a workstation, or a cloud or the like which has the higher calculation performance than the low function device. The low function device 10 includes an imaging device 11. The high function device 20 includes a multi-core processor 21, a storage 22, and a high CNN calculation part 23.

The imaging device 11 captures images of workpieces 1, 2, 3, . . . , n (hereinafter, also referred to as workpiece n) sequentially flowing at intervals of determination time Tj. The low function device 10 generates an image signal Gr or a data signal Di at an intermediate stage of the CNN on the basis of an imaging result of the imaging device 11 and transmits it to the high function device 20. The image signal Gr may show a gray determination in which an identification degree of the workpiece n is less than a predetermined value (for example, 50%) and the identification is ambiguous. The image processing system 100A determines presence or absence of scratches on the workpiece n in accordance with the identification degree.

The high function device 20 receives the image signal Gr or the data signal Di and carries out a CNN calculation of the image signal Gr or the data signal Di in the high CNN calculation part 23. The high function device 20 generates a determination signal Jd indicating a determination result of the workpiece n on the basis of a calculation result in the high CNN calculation part 23 and transmits the determination signal Jd to the low function device 10. Upon relearning of the CNN, the high function device 20 transmits a relearned model data signal Dm to the low function device 10.

Figure 2:
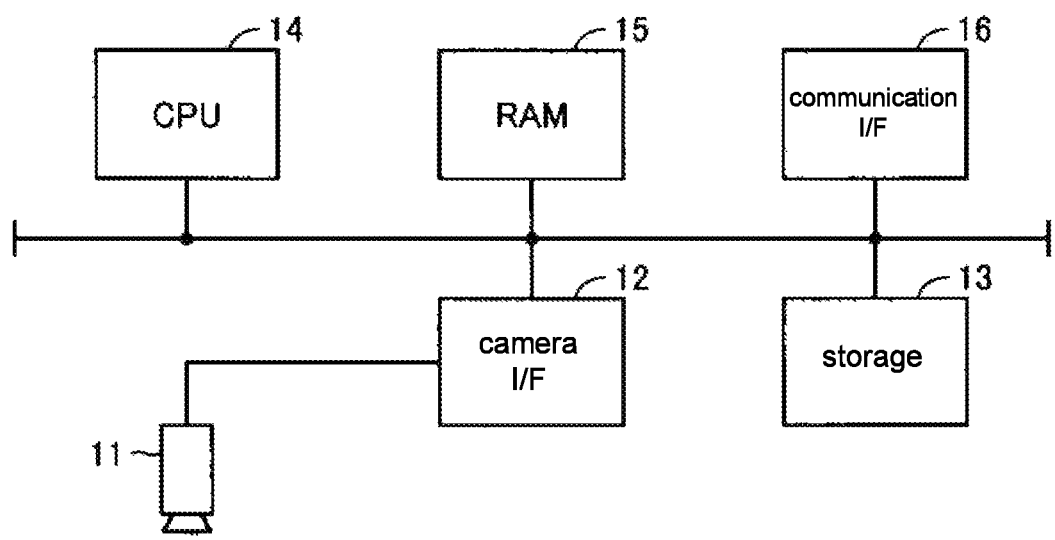
FIG. 2 is a functional block diagram illustrating an example of a configuration of a low function device 10 according to the first embodiment of the disclosure.

FIG. 2 is a functional block diagram illustrating an example of a configuration of the low function device 10 according to the first embodiment of the disclosure.

Referring to FIG. 2, the low function device 10 includes the imaging device 11, a camera interface (I/F) 12, a storage 13, a central processing unit (CPU) 14, a random access memory (RAM) 15, and a communication I/F 16.

The imaging device 11 captures an image of the workpiece n and transmits the imaging result to the camera I/F 12. The camera I/F 12 transmits the imaging result to the storage 13, the CPU 14, the RAM 15, and the communication I/F 16. The storage 13 stores the imaging result of the imaging device 11, a calculation program used in the CPU 14, a calculation result in the CPU 14, and so on for long term. The CPU 14 calculates the imaging result of the imaging device 11 with a low CNN. The RAM 15 stores intermediate results of the calculation by the CPU 14 for short term. The communication I/F 16 outputs the image signal calculated by the CPU 14 or the data signal at the intermediate stage of the CNN to the high function device 20 and receives a signal from the high function device 20.

Figure 3:
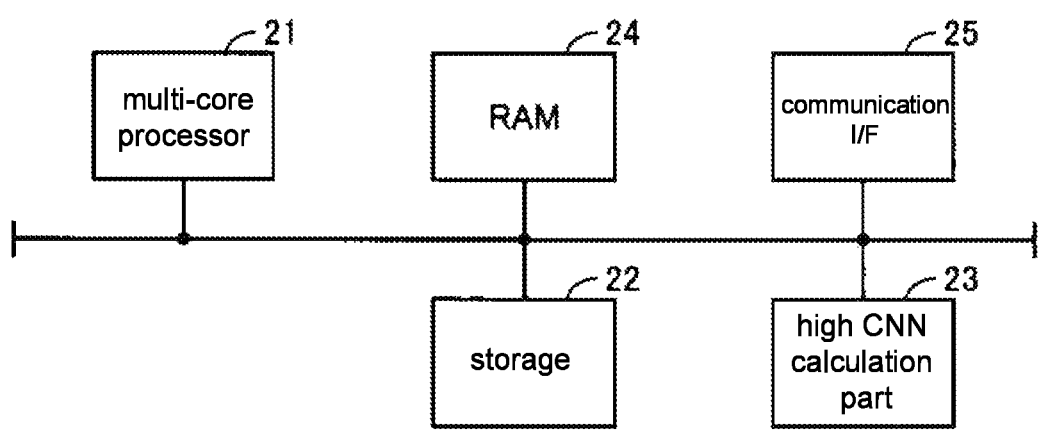
FIG. 3 is a functional block diagram illustrating an example of a configuration of a high function device 20 according to the first embodiment of the disclosure.

FIG. 3 is a functional block diagram illustrating an example of a configuration of the high function device 20 according to the first embodiment of the disclosure.

Referring to FIG. 3, the high function device 20 includes the multi-core processor 21, the storage 22, the high CNN calculation part 23, a RAM 24, and a communication I/F 25. The high CNN calculation part 23 includes a learned network model of the CNN which is capable of performing precise determination.

The multi-core processor 21 performs the CNN calculation or the like of an image signal or a data signal transmitted from the low function device 10 via the communication I/F 25. The storage 22 stores the image signal and the data signal transmitted from the low function device 10, a calculation program used in the multi-core processor 21, a calculation result in the multi-core processor 21, and so on for long term.

The high CNN calculation part 23 calculates the image signal or the data signal transmitted from the low function device 10 with a high CNN. Further, the high CNN calculation part 23 performs relearning off line using the image signals of the gray determination which is accumulated. In addition, the high CNN calculation part 23 also relearns the model constructed on the low function device 10 side, transmits the relearned model to the low function device 10 and updates the CNN.

The RAM 24 stores an intermediate result of the calculation in the multi-core processor 21, or the like for short term. The communication I/F 25 outputs the determination signal indicating the determination result of the workpiece n and the relearned model data signal to the low function device 10 and receives a signal from the low function device 10.

As described above, according to the first embodiment, even if the workpiece is difficult to determine with the low function device in the inspection using the CNN, it can be determined via the high function device by disposing the learned network model of the CNN which allows precise determination on the high function device side. Further, the high function device receives the data signal at the intermediate stage of the CNN from the low function device and identifies and determines it, and thus the inspection can be performed in real time.

Second Embodiment

Figure 4:
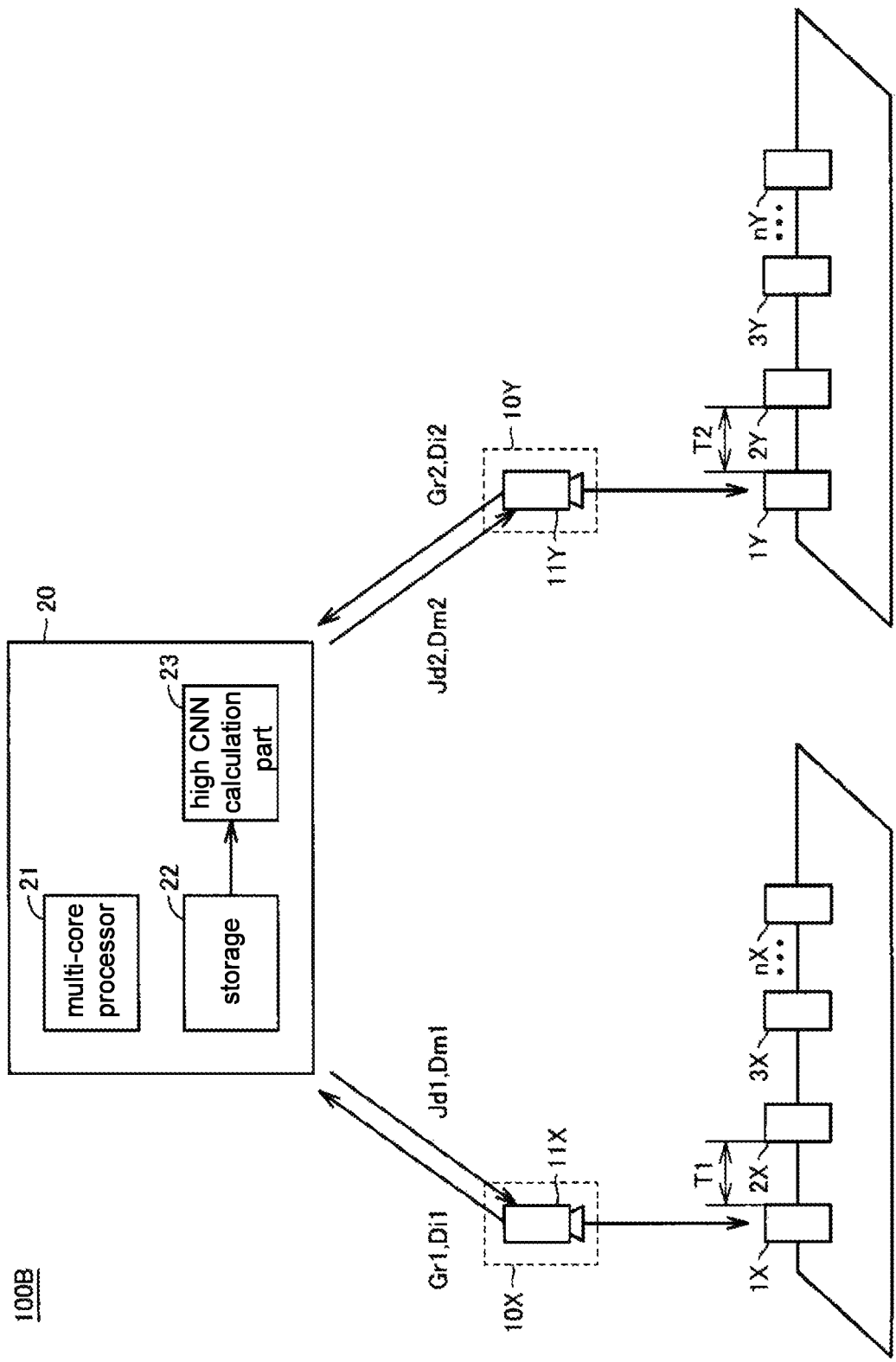
FIG. 4 is a schematic diagram illustrating an image processing system 100B according to a second embodiment of the disclosure.

FIG. 4 is a schematic diagram illustrating an image processing system 100B according to a second embodiment of the disclosure.

Referring to FIG. 4, the image processing system 100B includes low function devices 10X and 10Y and a high function device 20. The low function devices 10X and 10Y include imaging devices 11X and 11Y, respectively. Like in FIG. 1, the high function device 20 includes a multi-core processor 21, a storage 22, and a high CNN calculation part 23.

The imaging device 11X captures images of workpieces 1X, 2X, 3X, . . . , nX (hereinafter, also referred to as workpiece nX) sequentially flowing at intervals of determination time T1. The low function device 10X generates an image signal Gr1 or a data signal Di1 at an intermediate stage of the CNN on the basis of an imaging result of the imaging device 11X and transmits it to the high function device 20.

The imaging device 11Y captures images of workpieces 1Y, 2Y, 3Y, . . . , nY (hereinafter, also referred to as workpiece nY) sequentially flowing at intervals of determination time T2. The low function device 10Y generates an image signal Gr2 or a data signal Di2 at an intermediate stage of the CNN on the basis of an imaging result of the imaging device 11Y and transmits it to the high function device 20.

The high function device 20 receives the image signals Gr and Gr 2 or the data signals Di1 and Di2 and carries out a CNN calculation of the image signals Gr1 and Gr2 or the data signal Di1 and Di2 in the high CNN calculation part 23. The high function device 20 generates a determination signal Jd1 indicating a determination result of the workpiece nX on the basis of a calculation result in the high CNN calculation part 23 and transmits the determination signal Jd1 to the low function device 10X. Further, the high function device 20 generates a determination signal Jd2 indicating a determination result of the workpiece nY on the basis of the calculation result in the high CNN calculation part 23 and transmits the determination signal Jd2 to the low function device 10Y. Upon relearning of the CNN, the high function device 20 transmits relearned model data signal Dm1 and Dm2 to the low function devices 10X and 10Y, respectively.

As described above, according to the second embodiment, even if the workpiece is difficult to be determined with one or more of a plurality of the low function devices in the inspection using the CNN, it is possible to increase the identification degree of the workpiece via the high function device by disposing the learned network model of the CNN which allows the precise determination on the high function device side, thereby performing the determination.

Third Embodiment

Figure 5:
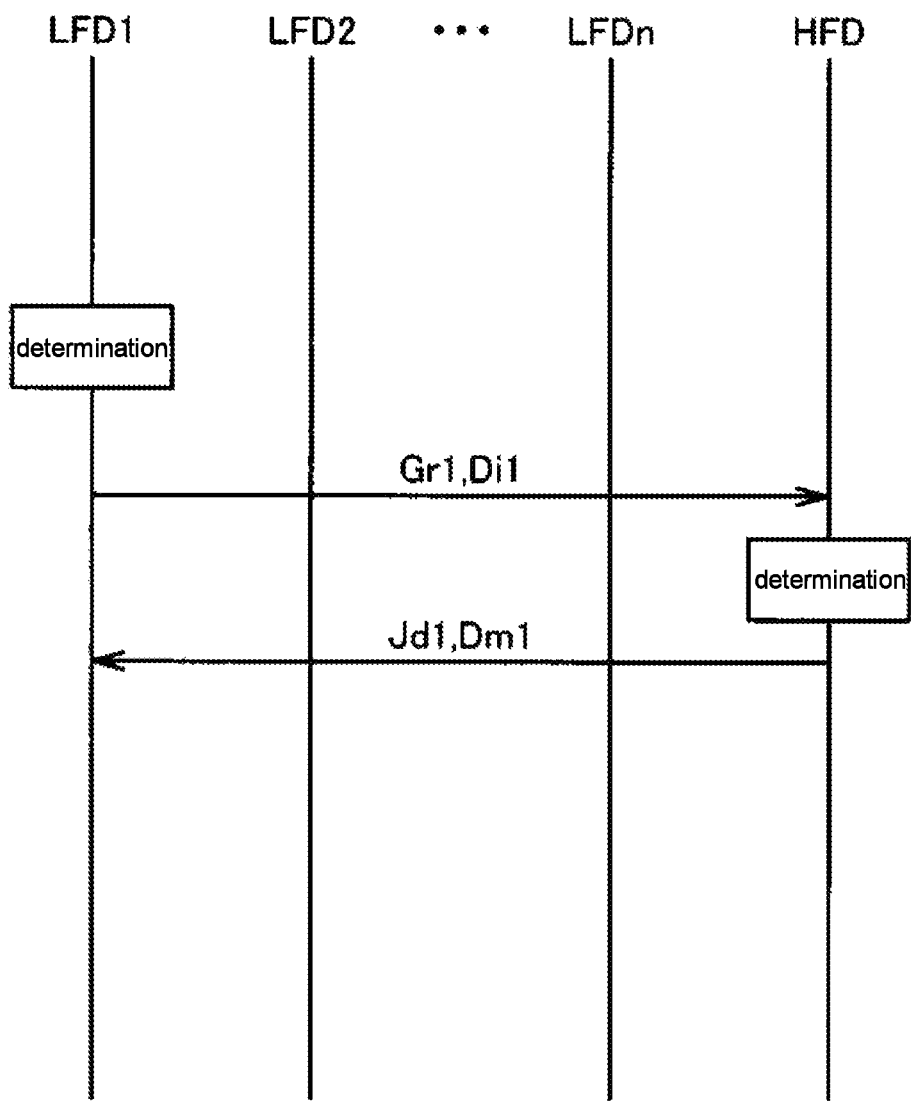
FIG. 5 is a schematic diagram illustrating an example of a determination flow of an image processing system according to a third embodiment of the disclosure.

FIG. 5 is a schematic diagram illustrating an example of a determination flow of an image processing system according to a third embodiment of the disclosure.

The image processing system of FIG. 5 includes low function devices LFD1, LFD2, . . . , LFDn and a high function device HFD. The low function device LFD1 determines an imaging result of the imaging device, generates an image signal Gr1 or a data signal Di1 at an intermediate stage of the CNN and transmits the signal to the high function device 20. The high function device HFD determines a calculation result in the high CNN calculation part, generates a determination signal Jd1 indicating a determination result of the workpiece and transmits the determination signal Jd1 to the low function device LFD1. The high function device HFD transmits a relearned model data signal Dm1 to the low function device LFD1 at the time of relearning of the CNN.

Figure 6:
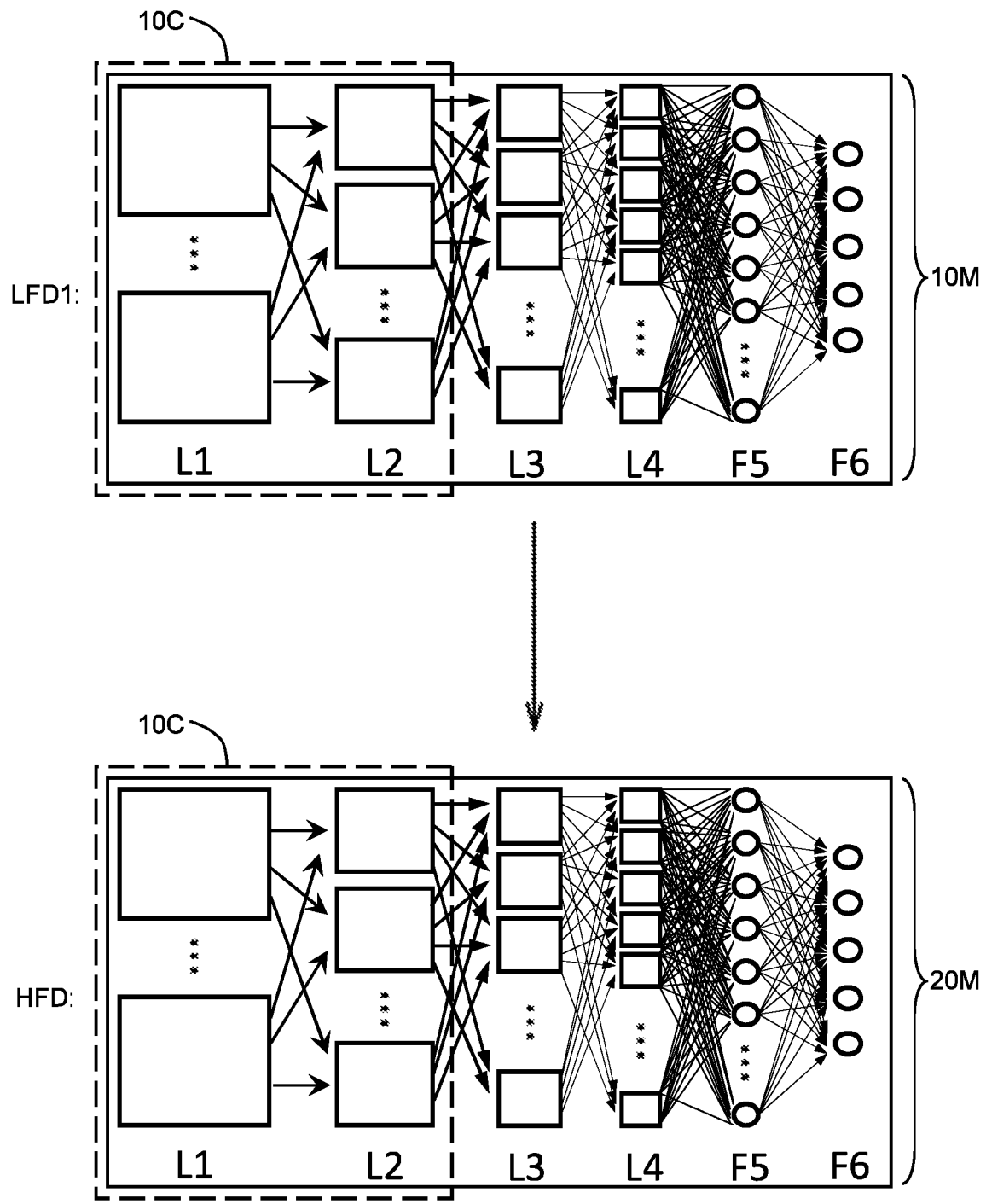
FIG. 6 is a schematic diagram illustrating an example of a CNN model of the image processing system corresponding to the determination flow of FIG. 5.

FIG. 6 is a schematic diagram illustrating an example of a CNN model of the image processing system corresponding to the determination flow of FIG. 5.

As illustrated in FIG. 6, the low function device LFD1 has a network model of a CNN 10M including a convolution layer 10C. The CNN includes a convolution layer L1~L4 and a fully connected layer F5~F6. In this example, an image signal is transmitted as the image signal Gr1 from the low function device LFD1 to the high function device HFD, and the high function device HFD receives the image signal and supports the determination of the low function device LFD1. The high function device HFD has a network model of a CNN 20M including the convolution layer 10C.

Figure 7:
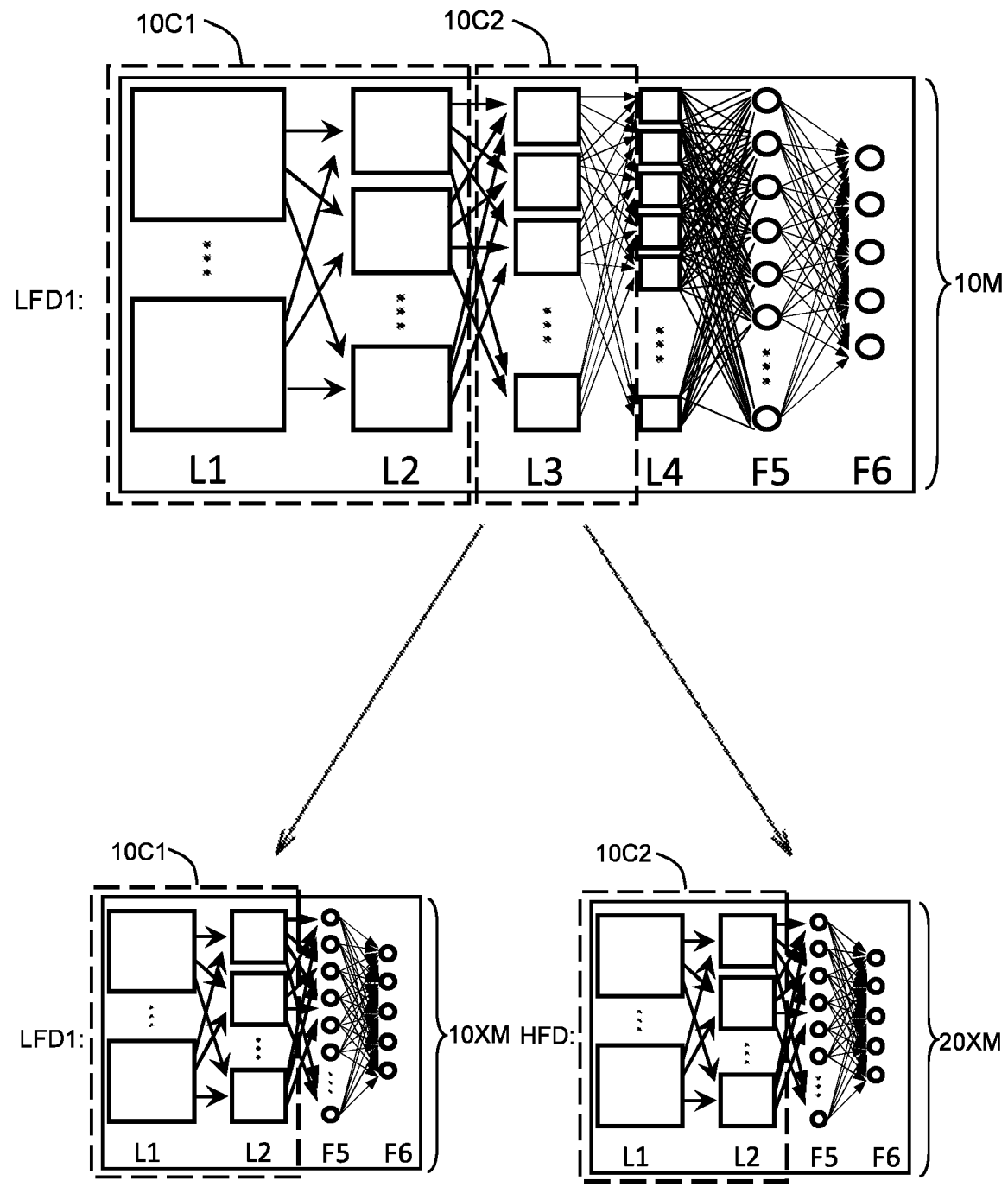
FIG. 7 is a schematic diagram illustrating another example of the CNN model of the image processing system corresponding to the determination flow of FIG. 5.

FIG. 7 is a schematic diagram illustrating another example of the CNN model of the image processing system corresponding to the determination flow of FIG. 5.

As illustrated in FIG. 7, the low function device LFD1 has a network model of a CNN 10M including convolution layers 10C1 and 10C2. In this example, a data signal Di1 at an intermediate stage of the CNN is transmitted from the low function device LFD1 to the high function device HFD, and the high function device HFD receives the signal and partially supports the determination of the low function device LFD1. As a result of transmitting the data signal Di1 of the intermediate stage of the CNN, the low function device LFD1 becomes a network model of a CNN 10XM including the convolution layer 10C1. As a result of receiving the data signal Di1, the high function device HFD becomes a network model of a CNN 20XM including the convolution layer 10C2.

According to the third embodiment as described above, in the inspection using the CNN, when the image signal is transmitted from the low function device, the determination of the low function device is supported by providing the learned network model of the CNN which allows the precise determination on the high function device side. Further, when the data signal at the intermediate stage of the CNN is transmitted from the low function device, the determination of the low function device is partially supported. Accordingly, even if the workpiece is difficult to determine with the low function device in the inspection using the CNN, it can be determined via the high function device.

Fourth Embodiment

Figure 8:
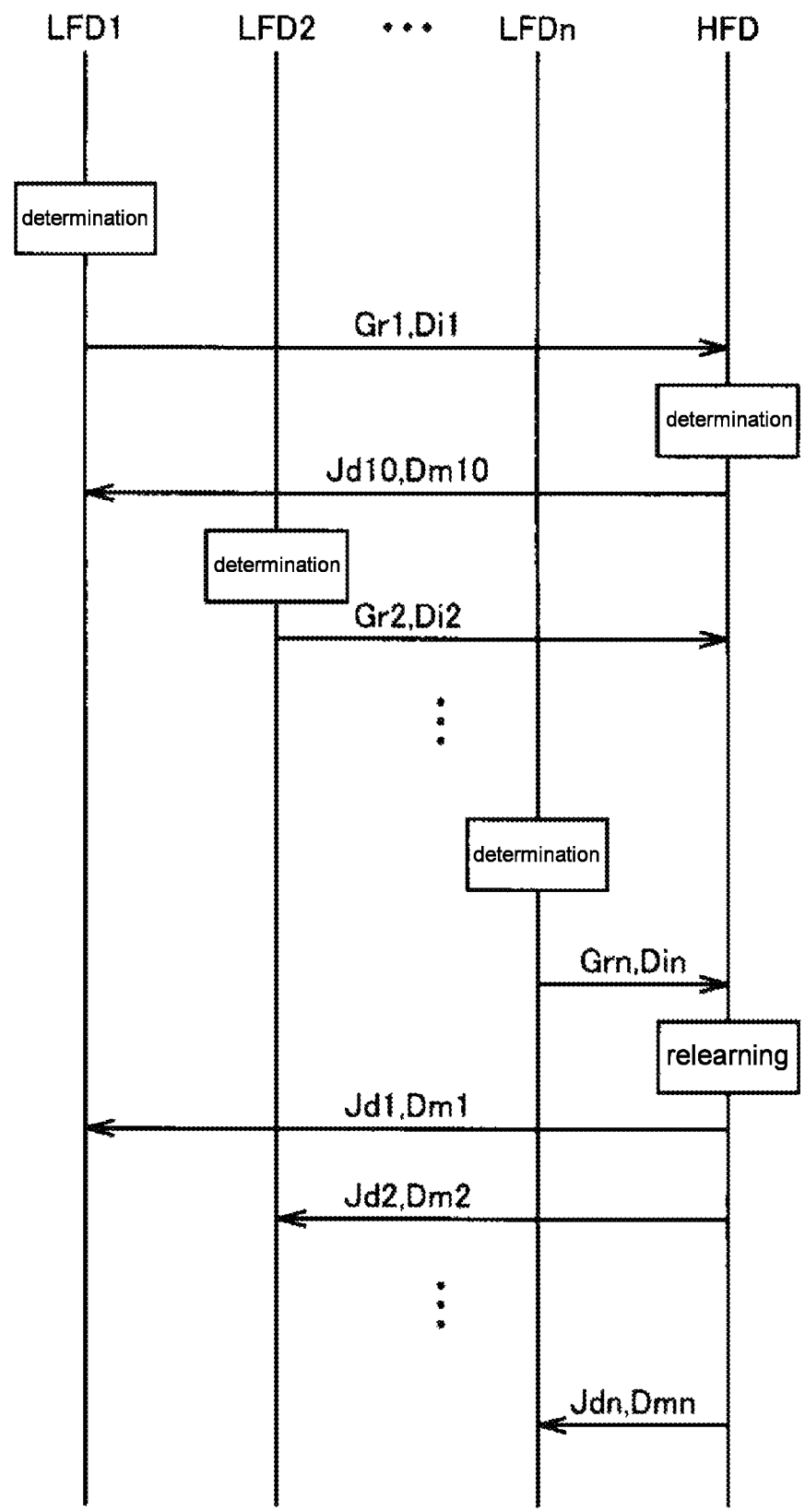
FIG. 8 is a schematic diagram illustrating an example of a determination flow of an image processing system according to a fourth embodiment of the disclosure.

FIG. 8 is a schematic diagram illustrating an example of a determination flow of an image processing system according to a fourth embodiment of the disclosure.

The image processing system of FIG. 8 includes low function devices LFD1, LFD2, . . . , LFDn and a high function device HFD. The low function device LFD1 determines an imaging result of the imaging device, generates an image signal Gr1 or a data signal Di1 at an intermediate stage of the CNN and transmits the signal to the high function device 20. The high function device HFD determines a calculation result in the high CNN calculation part, generates a determination signal Jd10 indicating a determination result of the workpiece and transmits the determination signal Jd10 to the low function device LFD1. The high function device HFD transmits a relearned model data signal Dm1 to the low function device LFD1 at the time of relearning of the CNN.

Subsequently, the low function device LFD2 determines the imaging result of the imaging device, generates an image signal Gr2 or a data signal Di g at the intermediate stage of the CNN and transmits the signal to the high function device 20. Similarly, the low function device LFDn determines the imaging result of the imaging device, generates an image signal Gm or a data signal Din at the intermediate stage of the CNN and transmits the signal to the high function device 20 (n=1~n).

The high function device HFD receives the image signal Gm or the data signal Din at the intermediate stage of the CNN from the low function device LFDn and relearns the CNN model. On the basis of a result of the relearning, the high function device HFD generates a determination signal Jdn indicating a determination result of the workpiece and a relearned model data signal Dmn and transmits them to each of the low function devices LFD1, LFD2, . . . , LFDn.

Figure 9:
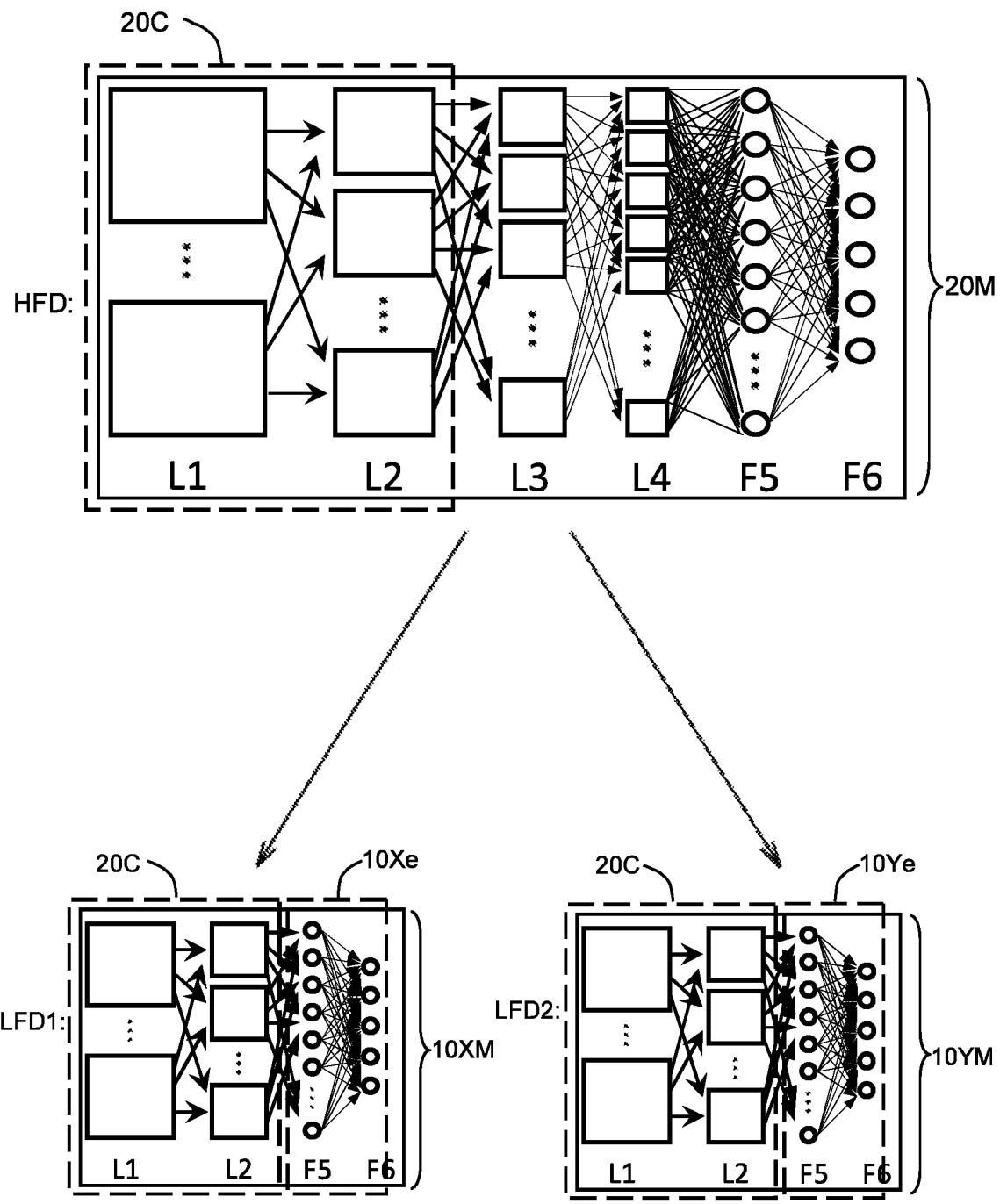
FIG. 9 is a schematic diagram illustrating an example of a CNN model of the image processing system corresponding to the determination flow of FIG. 8.

FIG. 9 is a schematic diagram illustrating an example of the CNN model of the image processing system corresponding to the determination flow of FIG. 8.

As illustrated in FIG. 9, the high function device HFD has a network model of a CNN 20M including a convolution layer 20C. In this example, the determination signal indicating the determination result of the workpiece and the relearned model data signal are transmitted from the high function device HFD to each of the low function devices LFD1 and LFD2. The low function devices LFD1 and LFD2 receive a relearned result and modify the fully connected layer portion of the CNN model. As a result, the low function device LFD1 has a network model of a CNN 10XM including a convolution layer 20C and a fully connected layer 10Xe. The low function device LFD2 has a network model of a CNN 10YM including a convolution layer 20C and a fully connected layer 10Ye.

As described above, in the relearning, the high function device HFD first receives the image signal or the data signal at the intermediate stage of the CNN from the low function devices LFD1 and LFD2 and relearns the entire CNN model. The high function device HFD creates a CNN model for a low function device in which a part of the learned CNN model on the high function device side has been implanted and relearns the CNN model. Each of the low function devices LFD1 and LFD2 receives the relearned CNN model for a low function device from the high function device HFD.

According to the fourth embodiment as described above, by providing the learned network model of the CNN which allows the precise determination on the high function device side and constructing a new CNN model on the low function device side using a part of the network, the determination can be performed through the high function device even on the workpiece which is difficult to be determined with the low function device in the inspection using the CNN.

Fifth Embodiment

Figure 10:
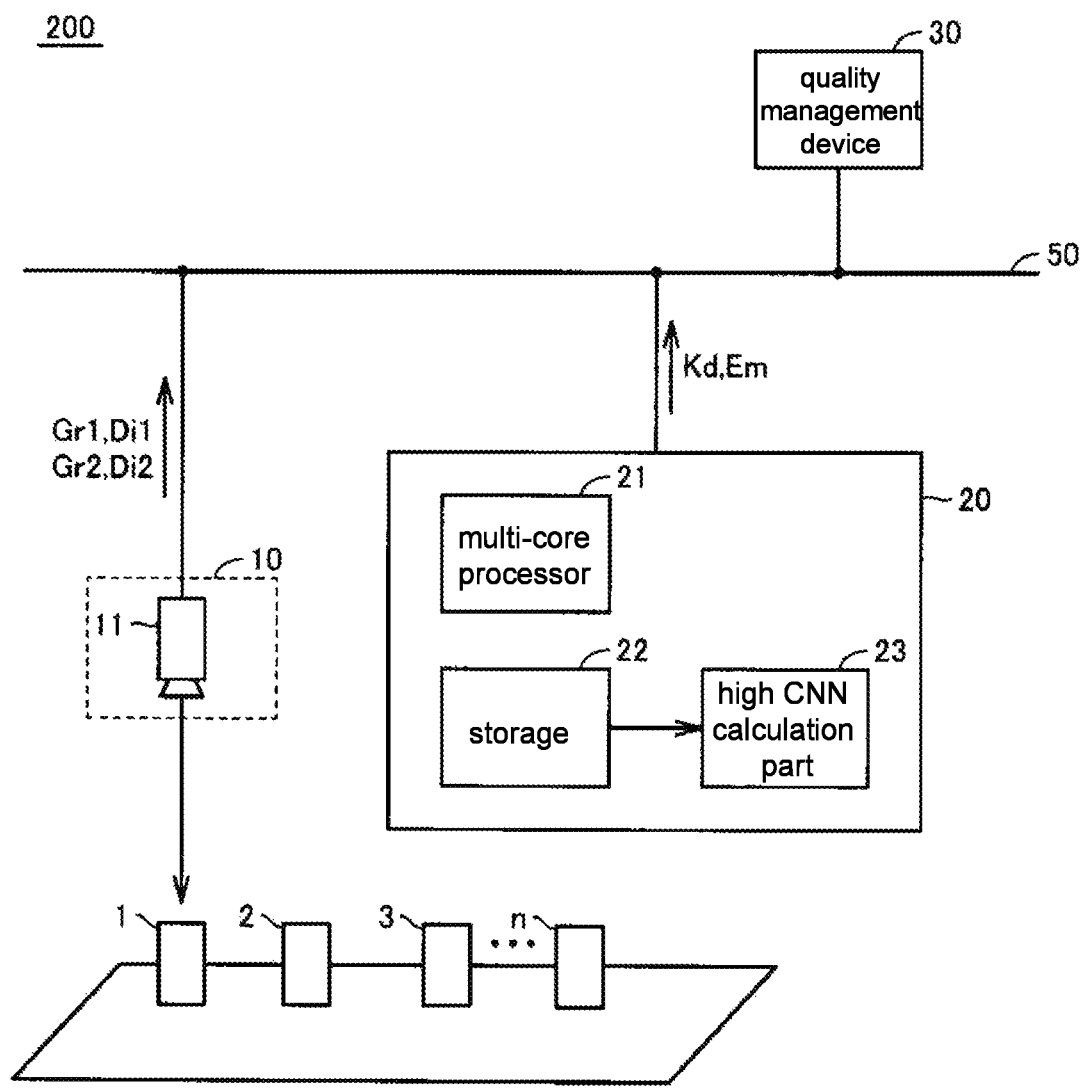
FIG. 10 is a schematic diagram illustrating an image processing system 200 according to a fifth embodiment of the disclosure.

FIG. 10 is a schematic diagram illustrating an image processing system 200 according to a fifth embodiment of the disclosure.

Referring to FIG. 10, the image processing system 200 includes a low function device 10, a high function device 20, a quality management device 30, and a cable 50. The low function device 10 includes the imaging device 11 as in FIG. 1. The high function device 20 includes the multi-core processor 21, the storage 22, and the high CNN calculation part 23 as in FIG. 1.

The imaging device 11 sequentially captures images of flowing workpieces 1, 2, 3, . . . , n (hereinafter, also referred to as workpiece n). The low function device 10 generates an image signal Gr1 or a data signal Di1 having a relatively high identification degree on the basis of an imaging result of the imaging device 11 and transmits the signal to the quality management device 30 via the cable 50. Further, the low function device 10 generates an image signal Gr2 or a data signal Di2 having a relatively low identification degree on the basis of the imaging result of the imaging device 11 and transmits the signal to the high function device 20 via the cable 50. The high function device 20 transmits a determination signal Kd, in which the image signal Gr2 and the data signal Di2 are further calculated by the high CNN calculation part 23, and a model data signal Em to the quality management device 30.

Figure 11:
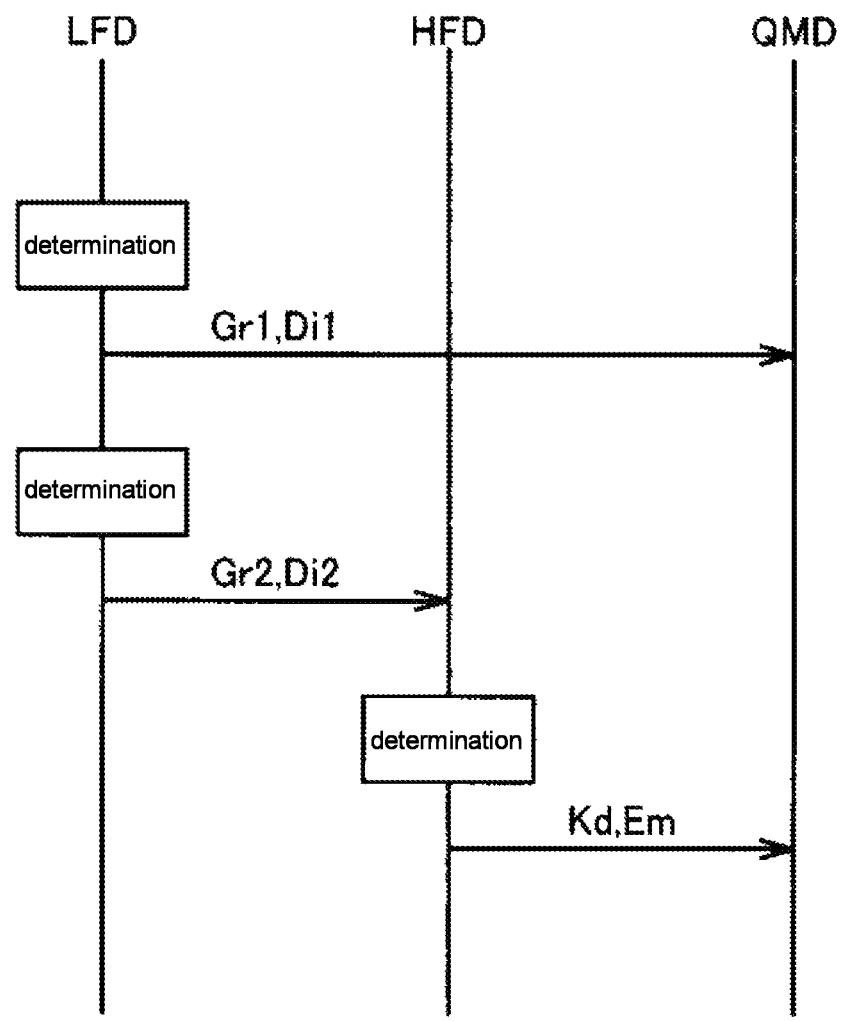
FIG. 11 is a schematic diagram illustrating an example of a determination flow of the image processing system 200 according to the fifth embodiment of the disclosure.

FIG. 11 is a schematic diagram illustrating an example of a determination flow of the image processing system 200 according to the fifth embodiment of the disclosure.

The image processing system 200 in FIG. 11 includes a low function device LFD, a high function device HFD, and a quality management device QMD. The low function device LFD determines the imaging result of the imaging device, generates the image signal Gr1 or the data signal Di1 having the relatively high identification degree and transmits the signal to the quality management device QMD. Further, the low function device LFD generates the image signal Gr2 or the data signal Di2 having the relatively low identification degree on the basis of the imaging result of the imaging device and transmits the signal to the high function device HFD. The high function device HFD transmits the determination signal Kd including a determination image in which the image signal Gr2 or the data signal Di2 is further calculated by the high CNN calculation part and the determination result, and the model data signal Em at the time of the relearning to the quality management device 30.

Figures 12, 13:
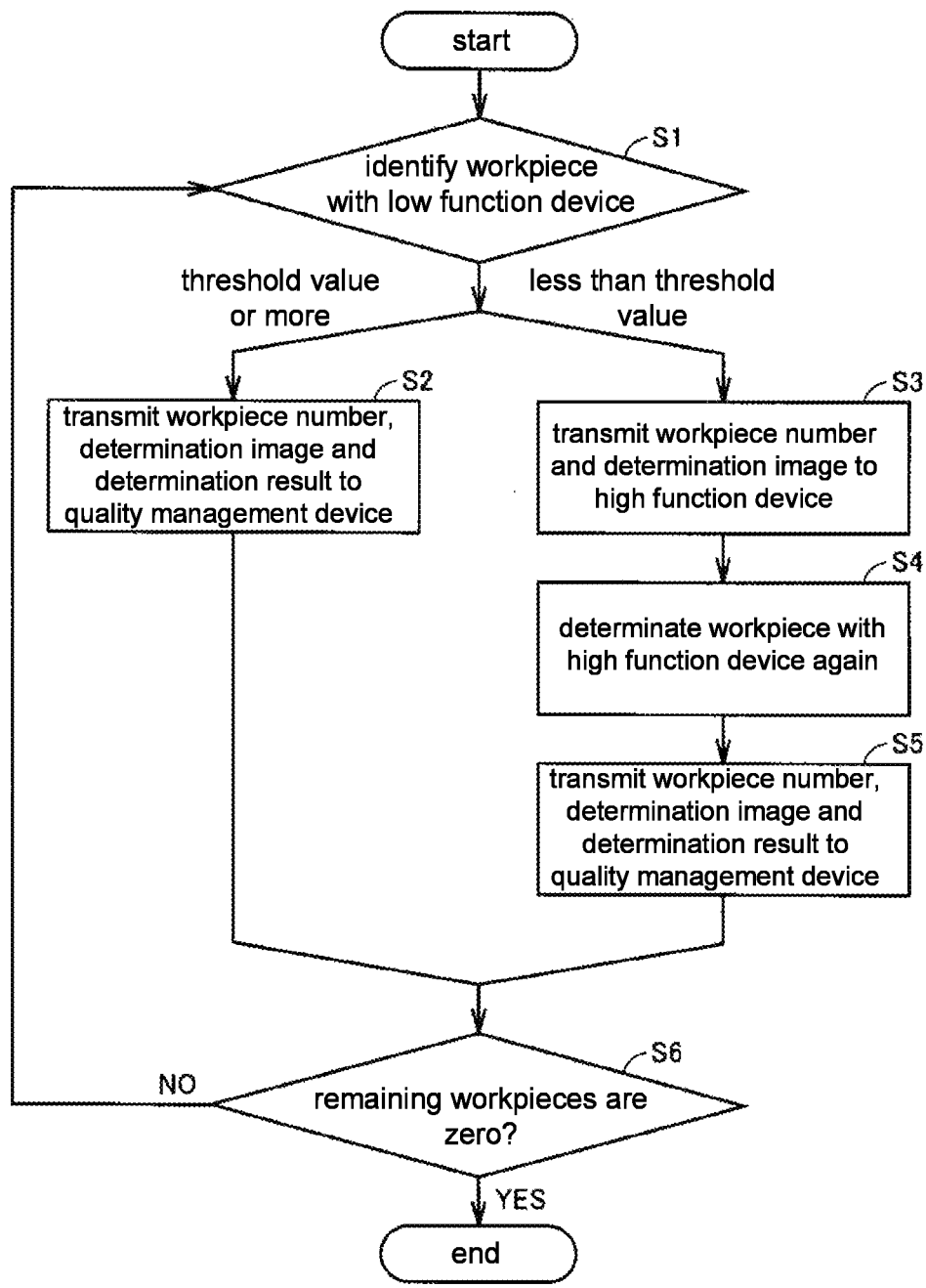
FIG. 12 is a flowchart illustrating an example of the determination flow of the image processing system 200 according to the fifth embodiment of the disclosure.
FIG. 13 is a diagram illustrating distribution of data with respect to an identification degree of a workpiece in the image processing system 200 according to the fifth embodiment of the disclosure.

FIG. 12 is a flowchart illustrating an example of the determination flow of the image processing system 200 according to the fifth embodiment of the disclosure.

Referring to FIG. 12, first, in Step S 1, the low function device 10 identifies a workpiece n which is an object. When an identification degree of the workpiece n is equal to or more than a predetermined threshold value (for example, 50%), a workpiece number, the determination image and the determination result are transmitted to the quality management device 30 in Step S2. On the other hand, when the identification degree of the workpiece n is less than the predetermined threshold value, the workpiece number and the determination image are transmitted to the high function device 20 in Step S3.

In Step S4, the workpiece is again determined by the high function device 20 on the basis of the determination image from the low function device 10. In Step S5, the workpiece number, the determination image and the determination result are transmitted from the high function device 20 to the quality management device 30. In Step S6, it is determined whether or not the remaining workpieces are zero. When the remaining workpieces are not zero, the process returns to Step S1. When the remaining workpieces are zero, the inspection is terminated.

FIG. 13 is a diagram illustrating distribution of data with respect to the identification degree of the workpiece in the image processing system 200 according to the fifth embodiment of the disclosure.

As illustrated in FIG. 13, since the identification degree of the workpiece 1 in the low function device LFD is 70%, the workpiece number, the determination image and an OK determination result are transmitted from the low function device LFD to the quality management device QMD and are not transmitted to the high function device HFD. Meanwhile, since the identification degree of the workpiece 2 in the low function device LFD is 45%, the work number, the determination image and an NG determination result are transmitted from the low function device LFD to the high function device HFD. In the high function device HFD, the OK determination result in which the determination image is further calculated by the high CNN calculation part and the identification degree is increased to 80% is transmitted from the high function device HFD to the quality management device QMD. The quality management device QMD associates the workpiece determination information or the like with each workpiece number.

According to the fifth embodiment as described above, by providing the learned network model of the CNN which allows the precise determination on the high function device side and also providing the quality management device which manages the object, the determination and management can be effectively performed through the high function device even on the workpiece which is difficult to be determined with the low function device in the inspection using the CNN.

It will be apparent to those skilled in the art that various modifications and variations can be made to the disclosed embodiments without departing from the scope or spirit of the disclosure. In view of the foregoing, it is intended that the disclosure cover modifications and variations provided that they fall within the scope of the following claims and their equivalents.

What is claimed is:

1. An image processing system which determines at least one object using at least one first devices and a second device having a higher calculation capability than the at least one first device, the second device generates a determination result that is more precise than a determination result of the first device by utilizing images accumulated in a storage part of the second device,
   wherein the at least one first device comprises a part configured to apply a first neural network to a captured image of the at least one object and to output a first determination result which identifies the at least one object, and a part configured to output the captured image to the second device when the first determination result meets a predetermined condition,
   the second device comprises a part configured to apply a second neural network preliminarily learned from a sample which is at least partially common to the first neural network to the captured image and to output a second determination result which identifies the at least one object, and
   the first neural network and the second neural network have a network structure having an intermediate layer and at least a part of which has a common portion,
   wherein the at least one first device comprises a part configured to output the captured image of which the first determination result is less than a predetermined value to the second device, and
   the second device comprises a part configured to relearn the second neural network of the second device when off line on the basis of the captured image which is less than the predetermined value by utilizing the captured image and images accumulated in the storage part of the second device, and then the second device further updates the common portion of the intermediate layer of the first neural network of the first device by transmitting a relearned model data signal of the common portion of the intermediate layer of the second neural network of the second device to the common portion of the intermediate layer of the first neural network of the first device.

2. The image processing system according to claim 1, wherein the at least one first device receives the second determination result and determines the at least one object in real time.

3. The image processing system according to claim 1, wherein the second device comprises a part configured to create a model of the first neural network on the basis of a portion of the relearned second neural network which is common to the first neural network, and a part configured to relearn a portion unique to the first neural network in the model of the first neural network.

4. The image processing system according to claim 1, further comprising a management device configured to manage the determination result for each object, wherein the at least one first device comprises a part configured to output the first determination result to the management device, the second device comprises a part configured to output the second determination result to the management device, and the management device associates at least one of the first determination result and the second determination result with the object for each of the at least one objects.

5. The image processing system according to claim 2, further comprising a management device configured to manage the determination result for each object, wherein the at least one first device comprises a part configured to output the first determination result to the management device, the second device comprises a part configured to output the second determination result to the management device, and the management device associates at least one of the first determination result and the second determination result with the object for each of the at least one objects.

6. The image processing system according to claim 1, further comprising a management device configured to manage the determination result for each object, wherein the at least one first device comprises a part configured to output the first determination result to the management device, the second device comprises a part configured to output the second determination result to the management device, and the management device associates at least one of the first determination result and the second determination result with the object for each of the at least one objects.

7. The image processing system according to claim 3, further comprising a management device configured to manage the determination result for each object, wherein the at least one first device comprises a part configured to output the first determination result to the management device, the second device comprises a part configured to output the second determination result to the management device, and the management device associates at least one of the first determination result and the second determination result with the object for each of the at least one objects.

8. The image processing system according to claim 1, wherein the first neural network and the second neural network are convolution neural networks.

* * * * *